3,013,257
BATTERY FAILURE ALARM
Carmelo Ippolito, Seymour, Conn., assignor to Dual-Lite Company, Inc., Bridgeport, Conn., a corporation of Connecticut
Filed Mar. 11, 1959, Ser. No. 798,642
6 Claims. (Cl. 340—249)

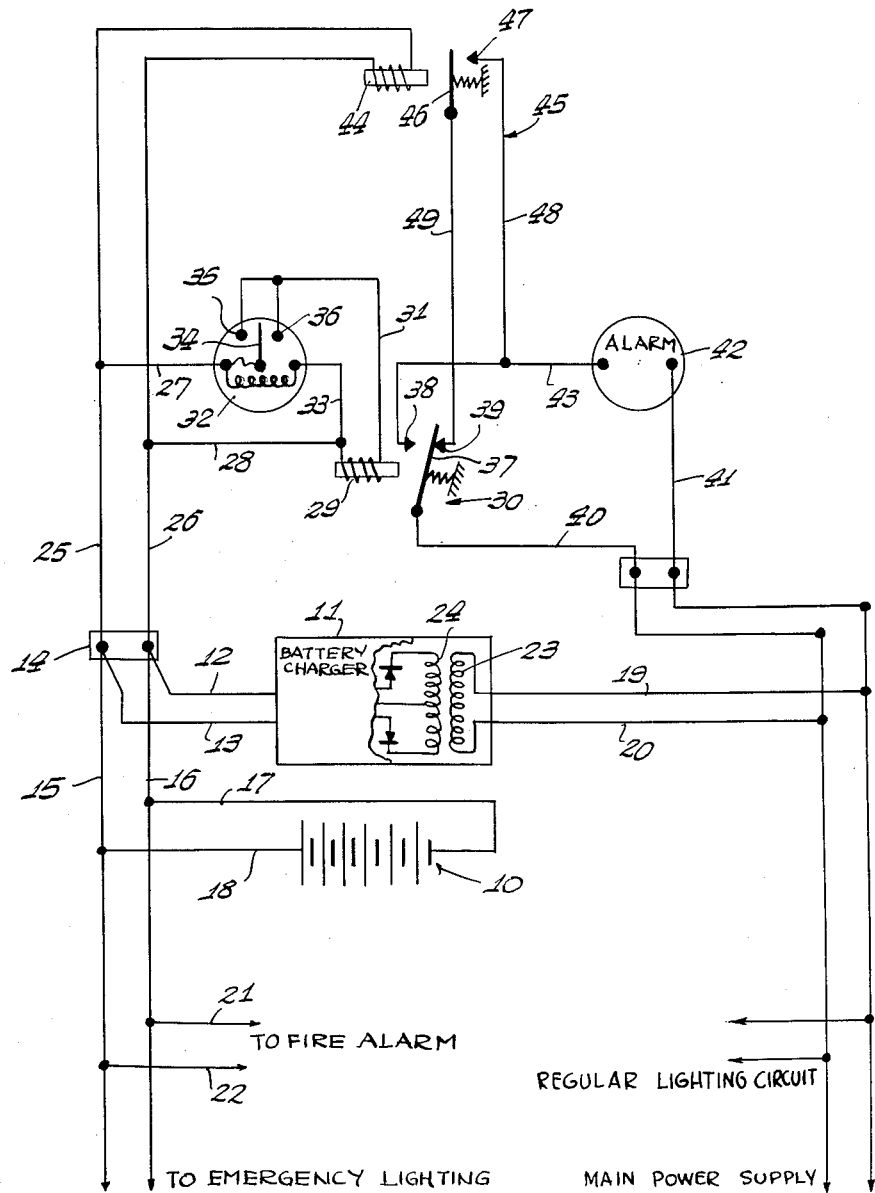

The instant invention pertains to emergency stand-by electrical equipment. This equipment is advantageously employed to provide emergency lighting in institutions such as hospitals and schools as well as elsewhere. The systems are designed to come into service instantaneously upon the failure of the main power supply. Such equipment relies on batteries for a reliable source of current and is not dependent on generators, etc. The batteries are usually maintained in proper charge by a battery charger driven by the main power source.

It is essential that an emergency lighting or alarm system will function when needed. However, because such systems are normally, only occasionally needed, they may be inactive for relatively long periods of time. A defect might thus easily remain undetected until the circuit is needed. Accordingly many arrangements have been heretofore devised to warn of open circuits and other conditions which would result in the inability of certain portions of these emergency systems to function when needed and thus prevent a false sense of security. Examples of such warning devices are found in U.S. Patents Nos. 2,804,554 and 2,864,005 issued August 27, 1957, and December 9, 1958, respectively. The instant invention pertains to a similar warning system. However, the instant invention does not simply monitor a portion of the emergency circuit but instead monitors the foundation of the system—its power supply. In the event the latter is in improper condition or is disconnected the whole system will fail.

It is essential that the emergency power source be at all times in excellent condition in order to be instantly ready to provide the required emergency service. Accordingly, one object of the instant invention is to provide an alarm system for warning of improper conditions in the power supply system or even the likelihood of such improper conditions.

The power supply used with the emergency lighting system, as stated above, comprises a battery. It must be maintained in a continuously charged state in order to properly function when needed. For this purpose battery charging means is associated with the main power supply used and it is in constant service to maintain the emergency lighting system's battery at proper charge. Obviously improper functioning of the battery charger system will affect the condition of the battery, and, accordingly, although from all appearances the emergency system might be in proper condition, it might not properly respond if the battery charging system were deranged. With respect to the battery itself there is obviously the possibility that the charge in the battery is maintained too low or that the charge is too high. If too low of course the lighting circuits or other circuits will not function when needed. If too high the battery may be damaged and again the circuits may improperly function. If, as another example, the battery charging circuit failed and it did not automatically shut off when charging the battery it would impose increasing loads on the battery and would soon damage it. Accordingly one of the objects of this invention is to provide a battery alarm system which will indicate improper charging of the battery, and will also warn of undesirably low or high charge of the battery.

Another object of the invention is to provide a warning means for warning whenever the D.C. circuit of the battery is interrupted so that the power would not be supplied to the emergency circuit when needed.

A further object of the invention is to provide alarm circuits as set forth above which operate on the main power supply. Thus according to the invention the emergency power supply condition will be indicated at all times whenever the main power supply is functioning. Since an indication of failure of the main supply is given by the emergency system coming into action, and the means warning of improper conditions in the emergency system are powered by the main power supply, each system in effect checks the other.

Other occurrences may affect the power supply. For example, the battery voltage as stated above could drop to some extent below the floating rate of the batteries, whereby the charger would cease to function. Other exemplary occurrences which affect the power supply are a failure of the input rectifier and output load fuses in the charger circuit; a defect in the wiring transformer or rectifier; a defect in the operation of relays of the charger; a disconnection of the load wires from the battery; the electrolyte in the battery dropping below the cell plates in any one of the cells, or an open circuit across the battery. A still further object of the present invention is to provide means which will give a warning whenever any such defect is present.

A feature of this invention is the provision of means for signaling when the battery is removed from the circuit as by a broken wire or other means which signaling means utilizes the charger service as a source of energy, and the same signaling circuit which provides a high overcharge indication. Thus a high and low charge alarm is usable to also indicate when the battery is not in the circuit.

Other features and advantages will become apparent from the following description and the accompanying drawing.

The drawing is a schematic circuit diagram of a portion of an improved stand-by emergency electrical system for lighting and fire alarm purposes together with the supervisory alarm means provided according to the invention.

Referring in particular to the drawing:

The emergency lighting and supervisory apparatus according to the instant invention comprises a rechargeable storage battery 10. This may be of the nickel cadmium type or it can be of the lead acid type. It may be designed for any one of the usually desired voltages or any voltages which it is preferred to employ in a particular installation. An automatic battery charger 11 is provided for maintaining the charge of the storage battery 10. The battery charger is connected by leads 12 and 13 to terminal posts 14 and to leads 15 and 16. Leads 17 and 18 connect to the leads 15 and 16 and to the battery. The battery charger is connected to a main power supply by the leads 19 and 20. Leads 15 and 16 are extended to the emergency lighting system and are also connected to leads 21 and 22 leading to a fire alarm system. The battery charger transformer 23 has a high impedance output circuit comprising the secondary 24.

Supervisory and alarm circuit leads 25 and 26 are connected in parallel with the battery across the charger secondary and thus in series with the battery. Leads 25 and 26 are connected to leads 27 and 28. Lead 28 leads to one side of a coil 29 of relay 30, and the other side of the coil is connected to a lead 31. A "volt meter" type relay 32 has its coil and armature system connected to the lead 27 and to a lead 33. The latter is connected to the lead 28. It is seen thus that the coil structure of the "volt meter" relay is in series with the battery and the battery charger and is subject to the voltage output from both the battery charger and the battery. As is well known the volt meter relay comprises a flapper arm 34 and a pair of contacts 35 and 36 which are placed on opposite sides of this flapper arm. The latter contacts are adapted to be contacted by the flapper whenever the arm moves sufficiently to the right or left of its neutral position. It is indicated to be in the neutral position on the drawing. Relay 32 thus constitutes a high and low limit switch means which is utilized in accordance with the instant invention as a high or low limit contactor for actuating the alarm circuit. When the voltage sensed by the volt meter relay 32 is below a desirable point the flapper 34 will engage contact 35. When it is above a certain desirable point the flapper 34 will engage contact 36. Flapper 34 is connected to lead 27, and both contacts 35 and 36 are connected to lead 31. Accordingly when either one of contacts 35 or 36 is connected to the flapper 34 the relay coil 29 will be placed in series with the battery and also with the charger. The relay 30 includes a flapper 37 which operates between a pair of contacts 38 and 39. The flapper of relay 30 is normally connected to the contact 39. The flapper 37 is connected to one side of the main power supply through lead 40. The other side of the power supply is connected through lead 41 to one side of an audible alarm means 42. Lead 43 connects the other side of the alarm 42 to the normally open contact 38 of relay 30. Whenever flapper 34 of the volt meter relay 32 contacts either the high or low limit contact, 36 or 35 respectively, the relay 30 will be operated and the flapper 37 will strike contact 38. This will energize the audible alarm 42. The volt meter relay supervises the range of voltage variations deemed permissible in the battery and output of the battery charger.

Leads 25 and 26 are also connected to a relay coil 44 of a second relay 45. Relay 45 includes an armature 46. Armature 46 is normally biased into engagement with contact 47. The latter is connected to lead 43 by lead 48. The armature 46 is connected by lead 49 to contact 39. Since the relay coil 44 is connected across the battery and battery charger it is constantly energized and maintains the armature 46 disengaged from the contact 47. Whenever coil 44 is deenergized however the armature 46 will strike contact 47 and close a circuit for the alarm 42. The latter circuit can be traced through the wire 41, the alarm wires 43, 48 and 49, contact 39, armature 37 and wire 40.

From the foregoing it is apparent that the simple alarm system described completely supervises the emergency power supply. It will provide an alarm in the event of over charge of the battery, or extreme voltage from the charger, under charge of the battery or disconnection of the battery. The circuit will thus give an alarm whenever a fuse should fail within the charger, or whenever the charger fails to operate, when the electrolyte is too low, and whenever the voltage is too high or too low. Thus whenever the available power supply voltage varies out of a normal preselected range for any reason including disconnection or over charge an alarm will be given. One important feature of the circuit resides in the high impedance output circuit comprising the secondary 24.

It is important to note that if the battery were disconnected but the charger were still connected the normal condition of the relays 45 and 32 might be maintained even though there was fault which would result in failure of the emergency system. Accordingly the charger is designed so that open circuit voltage (across its output terminals) is approximately 25 percent above the highest voltage obtainable on high charge when the battery is in the circuit. Accordingly although this high voltage will maintain the relay 45 operated the voltage is so high that it will operate the volt meter relay and give an alarm. In one embodiment of the invention high charging voltage is 55 volts whereas the open circuit voltage is 90 volts.

Variations and modifications will occur to those skilled in the art and while I have shown a preferred form of the invention it will be understood that I claim an exclusive right to such variations and modifications as come within the scope of the appended claims.

I claim:

1. An emergency lighting apparatus comprising an auxiliary battery power source and a main power supply; means for maintaining the auxiliary source in a charged condition comprising a battery charger; non-automatic means continuously connecting said charger to the auxiliary power source; non-automatic means continuously connecting the charger to said main power supply; an alarm; means connecting said alarm to said main power supply; means for effecting energization of the alarm comprising a double throw switch and circuit means controlled thereby and connected to said main power supply and to said alarm means; and automatic means for closing the double throw switch in one direction or the other in accordance with high and low voltages respectively of said auxiliary power source, thereby to actuate the alarm.

2. The emergency lighting apparatus of claim 1 wherein the automatic means for closing the switch comprises a coil, said switch having a pivoted contact arm operable by said coil to close the switch circuits and to energize said alarm upon the occurrence of either a selected high or a selected low voltage of said auxiliary power source.

3. The emergency lighting apparatus of claim 1 in which there is a second biased-to-closed-position switch connected to said main power supply and to said alarm, in which there is an electrically energizable means for normally maintaining the second switch open, and in which there is non-automatic means continuously connecting the energizable means to said auxiliary power source for energization by the latter, said second switch being biased to normally close said alarm circuit when the electrically energizable means is unenergized.

4. The emergency lighting apparatus of claim 3, wherein the circuit means controlled by the double-throw switch includes normally closed contacts, and wherein said second switch is connected to the said normally closed contacts to effect energization of said alarm whenever said second switch is closed.

5. An emergency lighting apparatus comprising a main power supply; an auxiliary battery power source; a battery charger; non-automatic means continuously connecting the charger to the main power supply; non-automatic means continuously connecting the charger to the battery power source; a voltage-responsive double throw relay having a coil connected to the battery power source whereby high and low voltages of the source effect operation of the relay in opposite directions respectively to close the relay contacts; a second relay having a coil connected with the battery power source and with the contacts of the voltage-responsive relay whereby said high and low voltages both effect energization of the second relay; an alarm connected to the second relay contacts and to the main power supply, for energization when the second relay is energized; a third relay having a coil connected to the battery power source and having contacts normally biased to closed condition and connected to the alarm and to the main power supply whereby a total failure of the battery power source will effect energization of the alarm by means of said third relay.

6. The invention as defined in claim 5, in which the second relay has an additional contact and is biased to effect a normally closed circuit therethrough, and in which the contacts of the third relay are connected in a circuit with the additional contact of the second relay whereby the latter may render inoperative the contacts of the third relay in energizing the alarm.

References Cited in the file of this patent

UNITED STATES PATENTS

| | | |
|---|---|---|
| 1,710,542 | Landis | Apr. 23, 1929 |
| 1,761,002 | Williams | June 3, 1930 |
| 1,882,473 | Beetem | Oct. 11, 1932 |
| 1,922,079 | Dixon | Aug. 15, 1933 |
| 1,970,329 | Marrison | Aug. 14, 1934 |
| 2,106,968 | Dannehiser | Feb. 1, 1938 |
| 2,880,372 | Greppin | Mar. 31, 1959 |

FOREIGN PATENTS

| | | |
|---|---|---|
| 428,603 | Great Britain | May 16, 1935 |